Figure 1:
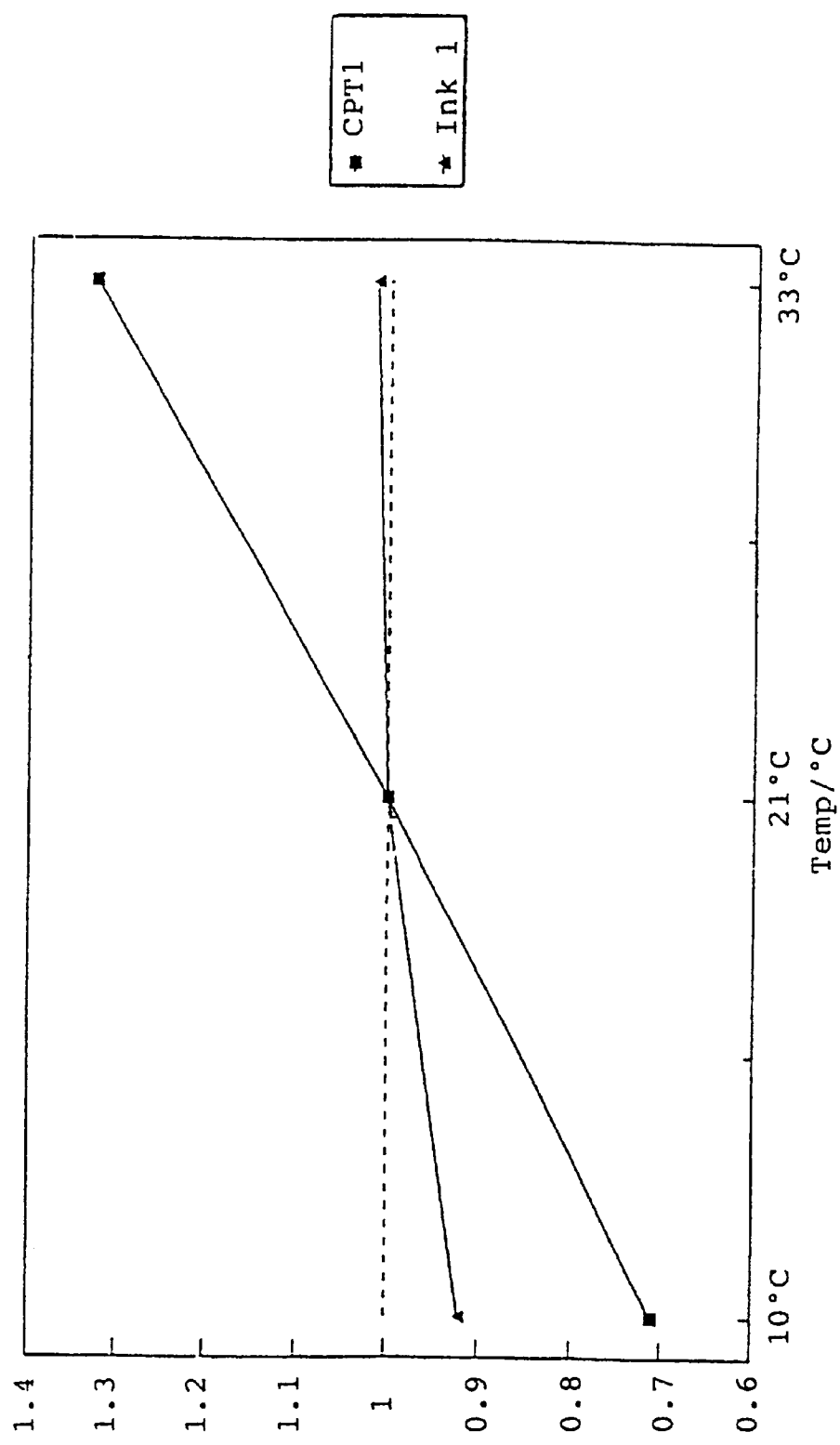

United States Patent
Adams et al.

[11] Patent Number: 6,066,199
[45] Date of Patent: May 23, 2000

[54] EMULSION INK

[75] Inventors: John Christopher Adams, Clackmannanshire; Peter James Stotereau, Glasgow, both of United Kingdom

[73] Assignee: G R Advanced Materials Ltd., United Kingdom

[21] Appl. No.: 09/101,408

[22] PCT Filed: Jan. 10, 1997

[86] PCT No.: PCT/GB97/00070

§ 371 Date: Oct. 27, 1998

§ 102(e) Date: Oct. 27, 1998

[87] PCT Pub. No.: WO97/25383

PCT Pub. Date: Jul. 17, 1997

[30] Foreign Application Priority Data

Jan. 10, 1996 [GB] United Kingdom .................. 9600428

[51] Int. Cl.[7] ............................................. C09D 11/02
[52] U.S. Cl. ................................. 106/31.26; 106/287.14
[58] Field of Search .......................... 106/31.26, 287.14

[56] References Cited

U.S. PATENT DOCUMENTS

| | | | |
|---|---|---|---|
| 5,132,047 | 7/1992 | Tanaka et al. | 106/287.14 |
| 5,378,739 | 1/1995 | Koike et al. | 106/31.26 |
| 5,417,749 | 5/1995 | Krishnan et al. | 106/31.26 |
| 5,575,839 | 11/1996 | Okuda | 106/31.25 |
| 5,738,715 | 4/1998 | Okuda et al. | 106/31.26 |
| 5,759,245 | 6/1998 | Okuda et al. | 106/31.36 |
| 5,776,232 | 7/1998 | Okuda et al. | 106/31.26 |

FOREIGN PATENT DOCUMENTS

| | | |
|---|---|---|
| 59-191777 | 10/1984 | Japan . |
| 3-292370 | 12/1991 | Japan . |

*Primary Examiner*—Helene Klemanski
*Attorney, Agent, or Firm*—Sughrue, Mion, Zinn, Macpeak & Seas, PLLC

[57] ABSTRACT

Ink comprising a water-in-oil emulsion consisting of an aqueous phase and an oil phase and a coloring agent, wherein the oil phase comprises at least about 25% w/w of a silicone oil and an emulsifier.

18 Claims, 1 Drawing Sheet

EMULSION INK

FIELD OF THE INVENTION

The present invention relates to an emulsion ink whose consumption level is substantially constant with temperature. The ink is particularly useful on digital and stencil duplicators, but may also be useful in other printing applications, e.g. letterpress and silk-screen printing.

BACKGROUND OF THE INVENTION

Inks for use on digital duplicators and stencil duplicators are generally based on water-in-oil emulsions, although the use of non-emulsion inks is also known. Examples of conventional water-in-oil emulsion inks are disclosed in U.S. Pat. No. 5,378,739.

JP-A-6,128,516 discloses a water-in-oil emulsion ink for use in a stencil printing method and which has improved set-off properties. The ink includes a thermosetting or a hot-melting component in the oil phase and a siliccone oil in the aqueous and/or oil phase in an amount of 1 to 20% w/w based on the total ink. In the inks exemplified the amount of silicone oil in the oil phase is at most 21.6% w/w.

A disadvantage with such inks is that their consumption level is dependent upon temperature, and consequently they give varying print quality depending on the temperature of the operating environment. Aspects of print quality which relate to ink consumption, and therefore ink temperature, include print density, set-off and solid area infill.

EP-A-0,661,356 discloses a water-in-oil emulsion ink said to have improved temperature dependence. The ink contains a water-insoluble colouring agent in the aqueous phase thereby avoiding the need for a resinous dispersing agent in the oil phase. While a degree of temperature independence is achieved, this is only significant at the lower end of the normal operating range, and not over the whole range.

SUMMARY OF THE INVENTION

According to the present invention, an ink comprises a water-in-oil emulsion consisting of an aqueous phase and an oil phase, and a colouring agent, wherein the oil phase is a continuous phase and comprises at least 25% w/w of a silicone oil, and an emulsifier.

Provided that the silicone oil is present in sufficient concentration, the ink consumption in a digital or stencil duplicator, at least, is largely independent of temperature over the normal operating range, eg. around 10–35° C.

DESCRIPTION OF THE INVENTION

The silicone oil used in the present invention is incapable of forming an emulsion in the absence of a suitable emulsifier. Any suitable emulsifier may be used, but preferably the emulsifier is a silicone-based emulsifier as better miscibility with the silicone oil and better emulsion stability can be achieved with an emulsifier of this type.

In its simplest form, the oil phase comprises only emulsifier and silicone oil. In this case, the Emulsifier is preferably soluble in the silicone oil, but this is not essential as simple water-in-silicone emulsions can be achieved with emulsifiers that are insoluble in the silicone oil; see for instance "A Guide to Formulating Water-in Silicone Emulsions with Dow Corning 3225C Formulation Aid", Dow Corning 1995. Examples of emulsifiers that are soluble in silicone oils are disclosed in U.S. Pat. No. 5,132,047, and comprise alkyl siloxane polymers modified by a polyether group, or other substituent, attached to one of the terminal silicon atoms thereof.

It may be desirable to include a third component in the oil phase, to alter the properties of the ink according to the printing application, or to increase the miscibility of the emulsifier with the silicone oil. In this case, it is essential that the silicone oil at least is soluble in the third component, so as to form a substantially continuous oil phase. Preferably, the emulsifier is also soluble in the third component.

Examples of emulsifiers that are immiscible with the silicone oil, either totally, or as a result of the proportions of these components in the oil phase, and with which it may be desirable to use a third component as described above, include alkyl siloxane polymers having polyether side chains, of the general formula:

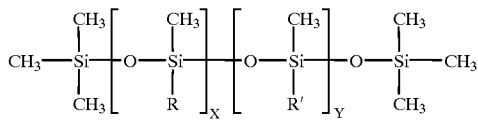

in which R is a $C_{10}$ or above alkyl group, for instance lauryl or cetyl, and R' is polyether. X and Y can vary widely, but examples of suitable ranges are X=1–100 and Y=1–40.

Examples of components used to increase the miscibility between the silicone oil and the emulsifier include hydrocarbon oils or solvents and cyclomethicones having the general formula:

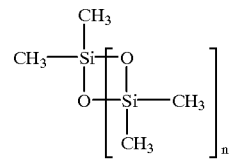

in which n=3, 4 or 5.

The cyclomethicones all tend to be volatile, whereas hydrocarbon oils or solvents used may be volatile or involatile. The use of a volatile third component may be preferred if its volatility is comparable to that of water thereby allowing the water/oil balance of the emulsion to be maintained despite evaporation during use on the printing machine. However, a disadvantage associated with the use of some volatile components is that their loss to the atmosphere may be sufficient to cause separation of the oil phase, resulting in collapse of the emulsion structure.

It is thought that the benefits which result from incorporating a silicone oil decrease as the proportion of the third component in the oil phase increases, assuming a constant proportion of emulsifier. Therefore, it is desirable to minimise the proportion of the: third component, preferably adding just sufficient to achieve solubility of the emulsifier.

The amount of emulsifier used in the ink composition need only be sufficient to achieve a stable water-in-oil emulsion. Typically, it is present in an amount of at least 1% or 2% w/w based on the total ink composition, although lower amounts may be used provided that the stability of the emulsion is not adversely affected. Very high emulsifier concentrations should preferably be avoided, as these will inevitably reduce the amount of silicone oil present in the ink composition. At least one co-emulsifier may also be included in the ink composition, to promote formation of the water-in-oil emulsion. One suitable example is triglyceryl-4-isostearate.

The oil phase concentration in the ink of the present invention can vary in the range 10 to 80% w/w, although concentrations outside this range may also be useful depending upon the emulsifier used. Typically, however, the oil phase concentration is in the range 15 to 50% w/w, preferably 20 to 30% w/w, and more preferably 20 to 25% w/w.

As mentioned above, when the oil phase comprises both silicone oil and hydrocarbon oil/cyclomethicone preferably the amount of silicone oil is maximised. The amount of silicone oil should be at least about 25% w/w of the oil phase, and is preferably at least about 30% w/w, and more preferably at least about 40% w/w, and most preferably at least about 50% w/w. However, it is apparent that there is latitude to vary the proportions of these two components outside these ranges and still achieve ink consumption which is substantially constant over a typical operating range of 10 to 35° C. By substantially constant we mean that the variation in ink consumption between the extremes of this temperature range (i.e. 10° C. and 35° C.) and ambient temperature (approx. 21° C.) is typically less than about 20%, preferably less than 15%, and more preferably less than 10%, as tested on a digital duplicator of the type described in the Example below. However, variations in consumption higher than these may be acceptable, depending on the printing application in which the ink is to be used.

Suitable silicone oils for use in the ink of the present invention include poly(dialkylsiloxane) oils, preferably poly(dimethylsiloxane) oils, such as those commercially available e.g. from Dow Corning, at varying molecular weights, and poly(arylalkylsiloxane) oils, such as poly(phenylmethylsiloxane) oils. The most preferred silicone oils are the poly(dimethylsiloxane) oils.

The coloration of the ink of the present invention is provided by a colouring agent which may be a pigment or a dye. The colouring agent may be located in the oil phase or in the aqueous phase of the ink, as desired, by means of conventional techniques, such as selection of an appropriate dispersant. Carbon black is normally used as the colouring agent for black ink and conventional organic pigments are used for other coloured inks, e.g. phthalocyanine blue. The amount of colouring agent used depends upon its type and in which phase it is to be dispersed; it can be up to 30% w/w based on the total ink composition, but is often less than this, for instance up to 10% w/w, e.g. 3–7% w/w carbon.

It may be necessary to vary the composition of the ink of the present invention, for instance with respect to the amount and viscosity of the oil phase and thet water content, according to the printing application, and in some cases according to the particular duplicator or other apparatus being used.

The ink composition of the present invention may contain additional, conventional ink components, for example, resins (water and/or oil soluble), stabilisers, extenders, waxes, anti-freeze agents, pigment dispetrsants, biocides and other components known to modify emulsion inks to beneficial effect.

The present invention is now illustrated by the following Example and the accompanying Figure.

EXAMPLE 1

Three inks were made to the formulations shown in Table 1 using the method outlined below.

TABLE 1

|  | INK 1 | INK 2 | INK 3 |
|---|---|---|---|
| OIL PHASE COMPONENTS % | | | |
| Poly(dimethylsiloxane): DC 200 5 cSt ($5 \times 10^{-6}$ m$^2$/s) (Dow Corning) | 13.6 | 6.8 | 0 |
| Hydrocarbon Distillate: Paraset 26H (Carless Refining and Marketing) | 4.6 | 11.4 | 9.5 |
| Hydrocarbon Oil: Texnap 46 (Texaco) | 0 | 0 | 8.7 |
| Emulsifier: Tegopren 7008 (Th Goldschmidt) | 2.0 | 2.0 | 2.0 |
| Co-Emulsifier: Isolan G1 34 (Th Goldschmidt) | 2.8 | 2.8 | 2.8 |
| Diluent for Emulsifier Blends: Hexyl Laurate for Ink 1 Process Oil G217 (Texaco) for Inks 2 & 3 | 2.0 | 2.0 | 2.0 |
| AQUEOUS PHASE COMPONENTS % | | | |
| Water | 51.2 | 50.4 | 50.4 |
| Pigment: 28% Carbon Dispersion in Water (27% C for Inks 2 & 3) | 15.3 | 16.1 | 16.1 |
| Stabiliser: Lithium Chloride for Ink 1 Potassium Sulphate for Inks 1 & 3 | 1.0 | 1.0 | 1.0 |
| Anti-freeze Agent: Ethylene Glycol | 7.5 | 7.5 | 7.5 |
| TOTAL | 100 | 100 | 100 |
|  | INK 1 | INK 2 | INK 3 |
| % Siloxane in Oil Phase | 54.4 | 27.2 | 0 |
| % Siloxane in ink | 13.6 | 6.8 | 0 |

Method
Preparation of Oil Phase

An emulsifier blend was made by mixing Tegopren 7008 (1 part) Isolan GI 34 (1.4 parts) and hexyl laurate (1 part), until a clear homogeneous liquid was obtained.

The oil phase was then prepared by adding in succession to a 1 litre vessel: emulsifier blend (27.3 g), Paraset 26H (18.2 g) and 5 cSt DC 200 Fluid (54.5 g). These were mixed using a stirrer fitted with a paddle blade at moderate speed for 2 minutes.

Preparation of Aqueous Phase

The components were added to a second vessel in succession: lithium chloride (3.7 g), aqueous carbon dispersion (61.3 g), ethylene glycol (30 g) and water (204.9 g) and stirred for 5 minutes.

Preparation of Emulsion Ink

The oil phase was stirred at moderate speed and a 2.0 ml portion of the aqueous phase was added dropwise with stirring, and stirring continued for a period of 1 minute. Thereafter, stirring was continued and the remainder of the aqueous phase was added over a period of 17 minutes. The resultant emulsion was then stirred with a 3-blade propeller stirrer for 2 minutes at moderate speed and for a further 3 minutes at high speed, at which point significant thickening occurred.

Table 2 shows the consumption and print densities of Ink 1 in comparison with a standard Gestetner ink grade CPT1 as tested on a Gestetner CopyPrinter (registered trademark) digital duplicator.

FIG. 1 is a graph of ink consumption results of Ink 1 and standard ink CPT1, on the basis of both inks giving a nominal consumption of 1 at 21° C.

Ink 1 shows considerably less variation in consumption than the standard CPT1 ink.

Table 3 shows the relative consumptions of Ink 2, which is an ink according to the invention, and Ink 3, which contains no silicone oil, as tested on a Gestetner CopyPrinter digital duplicator 5380.

Ink 3 is of lower viscosity than ink CPT1, and consequently shows less variation in consumption than CPT1. Irrespective of this, Ink 2 shows considerably less variation in consumption than Ink 3.

TABLE 2

| Digital Duplicator Model | | 5380 | | 5375 | |
|---|---|---|---|---|---|
| Temperature/° C. | | 10 | 21 | 21 | 33 |
| Ink Consumption[1]/g | Ink 1 | 18.4 | 20.0 | 29.8 | 30.3 |
| | Gestetner CPT1 | 9.4 | 13.3 | 16.3 | 21.6 |
| Print Density[2] | Ink 1 | 1.02–1.08 | 1.01–1.04 | 1.14–1.17 | 1.15–1.18 |
| | Gestetner CPT1 | 0.79–0.81 | 0.87–0.94 | 0.92–0.98 | 1.03–1.08 |

[1] Ink consumption is the weight of ink (g) to print 250 test prints on a specified standard paper using a standard Gestetner test original (approximately 15% coverage) made at default print speed.
[2] Print density was measured using a MacBeth RD914 reflection densitometer.

TABLE 3

| | INK 2 (Invention) | | INK 3 (Reference) | |
|---|---|---|---|---|
| Temp (° C.) | 20 | 30 | 20 | 30 |
| Consumption (g) | 27.8 | 32.9 | 23.2 | 29.2 |
| Consumption Relative To Unity At 20° C. | 1 | 1.2 | 1 | 1.3 |
| % Change in Consumption From 20° C. | — | +18.3 | — | +25.9 |

What is claimed is:

1. Ink comprising a water-in-oil emulsion consisting of an aqueous phase and an oil phase, and a colouring agent, wherein the oil phase is a continuous phase and comprises at least about 25% w/w of a silicone oil, and an emulsifier.

2. Ink according to claim 1, wherein the oil phase comprises at least about 30% w/w silicone oil.

3. Ink according to claim 2, wherein the oil phase comprises at least about 40% w/w silicone oil.

4. Ink according to claim 3, wherein the oil phase comprises at least about 50% w/w silicone oil.

5. Ink according to any preceding claim, wherein the emulsifier is a silicone-based emulsifier.

6. Ink according to any preceding claim, wherein the oil phase further comprises a component in which the silicone oil is soluble.

7. Ink according to claim 6, wherein the said component is a hydrocarbon oil or solvent.

8. Ink according to claim 6, wherein the said component is a cyclomethicone having the formula:

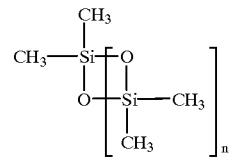

in which n=3, 4 or 5.

9. Ink according to any preceding claim, wherein the silicone oil is a poly(dialkylsiloxane) oil or a poly(arylalkylsiloxane) oil.

10. Ink according to claim 9, wherein the silicone oil is a poly(dimethylsiloxane) oil.

11. Ink according to any preceding claim, wherein the oil phase comprises 10 to 80% w/w of the total ink.

12. Ink according to claim 11, wherein the oil phase comprises 15 to 50% w/w of the total ink.

13. Ink according to claim 12, wherein the oil phase comprises 20 to 30% w/w of the total ink.

14. Ink according to any preceding claim, wherein the colouring agent is in the oil phase.

15. Ink according to any of claims 1 to 14, wherein the colouring agent is in the aqueous phase.

16. A method of printing an article by applying, through the use of a printing apparatus, to said article an ink comprising a water-in-oil emulsion consisting of an aqueous phase and an oil phase, and a coloring agent, wherein the oil phase is a continuous phase and comprises at least about 25% w/w of a silicone oil, and an emulsifier.

17. A method according to claim 16, wherein the ink is applied to said article using, as said printing apparatus, a stencil duplicator.

18. A method according to claim 16, wherein the ink is applied to said article using, as said printing apparatus, a digital duplicator.

* * * * *

UNITED STATES PATENT AND TRADEMARK OFFICE
CERTIFICATE OF CORRECTION

PATENT NO.    : 6,066,199
DATED         : May 23, 2000
INVENTOR(S)   : John Christopher Adams and Peter James Stotereau It is certified that error appears in the above-identified patent and that said Letters Patent is hereby corrected as shown below:

Claims 6, 9, 11, 14,
Line 1, replace "any preceding claim" with -- claim 1 --.

Claim 15,
Line 1, replace "any of claims 1 to 14" with -- claim 1 --.

Signed and Sealed this

Fourth Day of September, 2001

Attest:

*Nicholas P. Godici*

NICHOLAS P. GODICI
*Acting Director of the United States Patent and Trademark Office*

*Attesting Officer*